(12) United States Patent
Dewasurendra et al.

(10) Patent No.: US 10,518,613 B2
(45) Date of Patent: Dec. 31, 2019

(54) SWING CLAMP FOR CONNECTING PANELS OF MOTOR VEHICLE

(71) Applicant: Ford Global Technologies, LLC, Dearborn, MI (US)

(72) Inventors: Lohitha Dewasurendra, Canton, MI (US); Mukdam Kena, Sterling Heights, MI (US); Michael McElroy, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 80 days.

(21) Appl. No.: 15/880,876

(22) Filed: Jan. 26, 2018

(65) Prior Publication Data

US 2019/0232764 A1    Aug. 1, 2019

(51) Int. Cl.
*B60J 1/08* (2006.01)
*B60J 5/04* (2006.01)

(52) U.S. Cl.
CPC ........... *B60J 5/0416* (2013.01); *B60J 5/0463* (2013.01); *B60J 5/0469* (2013.01)

(58) Field of Classification Search
CPC ........... E05Y 2900/55; E05Y 2900/132; E05Y 2900/106; E05F 11/445; E05F 11/382; H01L 2924/0002; B31B 50/00; A61G 12/005; C08L 2666/22; C09J 167/00
See application file for complete search history.

(56) References Cited

U.S. PATENT DOCUMENTS

| | | | | |
|---|---|---|---|---|
| 1,895,309 A | * | 1/1933 | Boomershine | D06C 3/04 101/127.1 |
| 2,006,922 A | * | 7/1935 | Jacobi | E05B 63/22 70/141 |
| 2,182,589 A | * | 12/1939 | Jacobi | E05B 83/30 292/124 |
| 2,570,556 A | * | 10/1951 | Jacobi | E05B 83/30 292/127 |
| 2,744,405 A | * | 5/1956 | McClelland | E05B 83/30 70/368 |
| 3,003,348 A | * | 10/1961 | Jacobi | E05B 83/30 292/127 |
| 3,553,865 A | * | 1/1971 | Jones | G09F 3/203 40/643 |
| 3,661,410 A | * | 5/1972 | Larson | E05B 65/0817 52/127.9 |
| 3,782,139 A | * | 1/1974 | Rubner | E05C 1/16 70/81 |
| 4,223,940 A | * | 9/1980 | Janz | B60R 7/06 292/127 |
| 4,882,842 A | * | 11/1989 | Basson | B60J 5/0416 29/857 |

(Continued)

FOREIGN PATENT DOCUMENTS

DE        10229961 A1    1/2003

*Primary Examiner* — Kiran B Patel
(74) *Attorney, Agent, or Firm* — Vichit Chea; Carlson, Gaskey & Olds, P.C.

(57) ABSTRACT

A motor vehicle according to an exemplary aspect of the present disclosure includes, among other things, a first panel having an opening, a second panel configured to cover the opening, and at least one swing clamp attached to the second panel. The swing clamp is configured to clamp the second panel to the first panel. A method is also disclosed.

16 Claims, 2 Drawing Sheets

(56) References Cited

U.S. PATENT DOCUMENTS

| | | | | |
|---|---|---|---|---|
| 5,251,403 A * | 10/1993 | Compeau | B60J 5/0416 | 49/348 |
| 5,263,348 A * | 11/1993 | Wittwer | E05B 17/0058 | 70/223 |
| 5,355,703 A * | 10/1994 | Elinski | E05B 9/086 | 70/368 |
| 5,531,499 A * | 7/1996 | Vecchio | B60R 13/0206 | 188/377 |
| 5,695,177 A * | 12/1997 | Mascola | B25B 5/062 | 269/20 |
| 5,722,275 A * | 3/1998 | Price | E05B 13/105 | 70/360 |
| 5,778,511 A * | 7/1998 | Keaton | B23Q 1/4828 | 269/24 |
| 5,904,002 A * | 5/1999 | Emerling | B60J 5/0406 | 49/502 |
| 6,035,601 A * | 3/2000 | Yamaguchi | B60J 5/00 | 296/146.5 |
| 6,381,906 B1 * | 5/2002 | Pacella | B60J 5/0416 | 296/146.5 |
| 6,471,199 B2 * | 10/2002 | Nagai | B25B 5/12 | 269/228 |
| 6,571,515 B1 * | 6/2003 | Samways | B60J 5/0416 | 49/352 |
| 6,983,978 B2 * | 1/2006 | Radu | B60R 13/0243 | 296/146.5 |
| 7,111,834 B2 * | 9/2006 | Steele | B25B 5/062 | 269/24 |
| 7,111,894 B2 * | 9/2006 | Kora | B60J 5/0416 | 296/146.1 |
| 7,578,527 B2 | 8/2009 | Iverson et al. | | |
| 7,743,559 B2 * | 6/2010 | Papi | B60J 5/0416 | 49/502 |
| 7,766,401 B2 | 8/2010 | Costigan | | |
| 7,992,347 B2 * | 8/2011 | Roy | B60J 5/0413 | 296/146.7 |
| 8,172,305 B2 * | 5/2012 | Schmelz | B60J 5/0416 | 296/146.7 |
| 9,731,581 B2 * | 8/2017 | Fortin | B60J 5/06 | |
| 9,878,600 B2 * | 1/2018 | Rose | B60J 11/06 | |
| 2005/0134070 A1 * | 6/2005 | Plentis | B60R 9/02 | 296/37.1 |
| 2007/0040401 A1 * | 2/2007 | Poole | B60P 3/14 | 296/37.6 |
| 2009/0217714 A1 * | 9/2009 | O'Leary | E05B 47/023 | 70/84 |
| 2010/0171326 A1 * | 7/2010 | Bacon | E05B 13/108 | 292/336.3 |
| 2010/0223968 A1 * | 9/2010 | Krueger | E05B 5/00 | 70/283.1 |
| 2010/0300162 A1 * | 12/2010 | Cappuccio | E05B 17/2034 | 70/257 |
| 2011/0132047 A1 * | 6/2011 | Terhaar | E05B 17/04 | 70/91 |
| 2012/0186310 A1 * | 7/2012 | Bacon | E05B 9/086 | 70/77 |
| 2019/0128027 A1 * | 5/2019 | Schroll | E05B 81/90 | |

\* cited by examiner

SWING CLAMP FOR CONNECTING PANELS OF MOTOR VEHICLE

TECHNICAL FIELD

This disclosure relates to a swing clamp for connecting panels of a motor vehicle, and a corresponding method.

BACKGROUND

Motor vehicles are known to have various types of panels that are fastened together. One known type of panel includes a panel of a door, such as a driver or passenger door. Door panels include openings that provide access to the interior of the door. Typically, these openings are covered by a separate panel, which is fastened to the door panel using ordinary fasteners, such as nuts and bolts or rivets, as examples.

SUMMARY

A motor vehicle according to an exemplary aspect of the present disclosure includes, among other things, a first panel having an opening, a second panel configured to cover the opening, and at least one swing clamp attached to the second panel. The swing clamp is configured to clamp the second panel to the first panel.

In a further non-limiting embodiment of the foregoing motor vehicle, the swing clamp includes a shaft disposed along an axis and an arm projecting from the shaft.

In a further non-limiting embodiment of any of the foregoing motor vehicles, the swing clamp is configured such that the arm is both rotatable about the axis and linearly translatable along the axis.

In a further non-limiting embodiment of any of the foregoing motor vehicles, the shaft is a shaft of a threaded fastener.

In a further non-limiting embodiment of any of the foregoing motor vehicles, the second panel includes a first stop and a second stop, and the first and second stops limiting rotation of the arm.

In a further non-limiting embodiment of any of the foregoing motor vehicles, the first and second stops are arranged to allow the arm to rotate about the axis substantially 90° between the first and second stops.

In a further non-limiting embodiment of any of the foregoing motor vehicles, the swing clamp is configured such that rotation of shaft in a first direction causes the arm to rotate about the axis in the first direction until arm abuts one of the first and second stops, and such that further rotation of shaft in the first direction causes linear translation of the arm along the axis.

In a further non-limiting embodiment of any of the foregoing motor vehicles, the first panel provides a perimeter edge of the opening.

In a further non-limiting embodiment of any of the foregoing motor vehicles, the arm is located interiorly of the perimeter edge when the arm abuts the first stop, and the arm partially projects outward of the perimeter edge when the arm abuts the second stop.

In a further non-limiting embodiment of any of the foregoing motor vehicles, the arm includes tab, the first panel includes lip, and the tab is outward of the lip when the arm abuts the second stop.

In a further non-limiting embodiment of any of the foregoing motor vehicles, the at least one swing clamp includes a plurality of swing clamps, and the plurality of swing clamps are spaced-apart from one another about a perimeter edge of the second panel.

In a further non-limiting embodiment of any of the foregoing motor vehicles, the first panel is a door panel, and the second panel supports an integrated window regulator.

A method according to an exemplary aspect of the present disclosure includes, among other things, covering an opening in a first panel with a second panel, and clamping the second panel to the first panel using at least one swing clamp.

In a further non-limiting embodiment of the foregoing method, the method includes rotating an arm of the swing clamp about an axis of a shaft of the swing clamp after the covering step.

In a further non-limiting embodiment of any of the foregoing methods, the rotating step includes rotating the arm substantially 90° about the axis.

In a further non-limiting embodiment of any of the foregoing methods, the clamping step includes translating the arm linearly along the axis.

In a further non-limiting embodiment of any of the foregoing methods, the rotating step includes rotating the rotating the arm about the axis until the arm abuts a stop formed in the second panel.

In a further non-limiting embodiment of any of the foregoing methods, further rotation of the shaft about the axis causes the arm to translate linearly along the axis when the arm is in contact with the stop.

In a further non-limiting embodiment of any of the foregoing methods, the first panel defines a perimeter edge of the opening, the arm is entirely located interiorly of the perimeter edge before the rotating step, and the arm partially projects outward of the perimeter edge after the rotating step.

In a further non-limiting embodiment of any of the foregoing methods, the arm includes tab, the first panel includes lip, and the tab is outward of the lip after the rotating step.

DETAILED DESCRIPTION

This disclosure relates to a swing clamp for connecting panels of a motor vehicle, and a corresponding method. An example motor vehicle includes a first panel having an opening, a second panel configured to cover the opening, and at least one swing clamp attached to the second panel. The swing clamp is configured to clamp the second panel to the first panel. The first and second panels are securely fastened together using the swing clamp, and without using traditional fasteners, which require individual holes to be formed in one of the panels. The disclosed arrangement does not require the formation of fastener-receipt holes, which increases the ease of manufacture and assembly. Further, eliminating fastener-receipt holes increases the structural integrity of the panels, and allows one to change the arrangement of swing clamps with relative ease.

Figure 1:
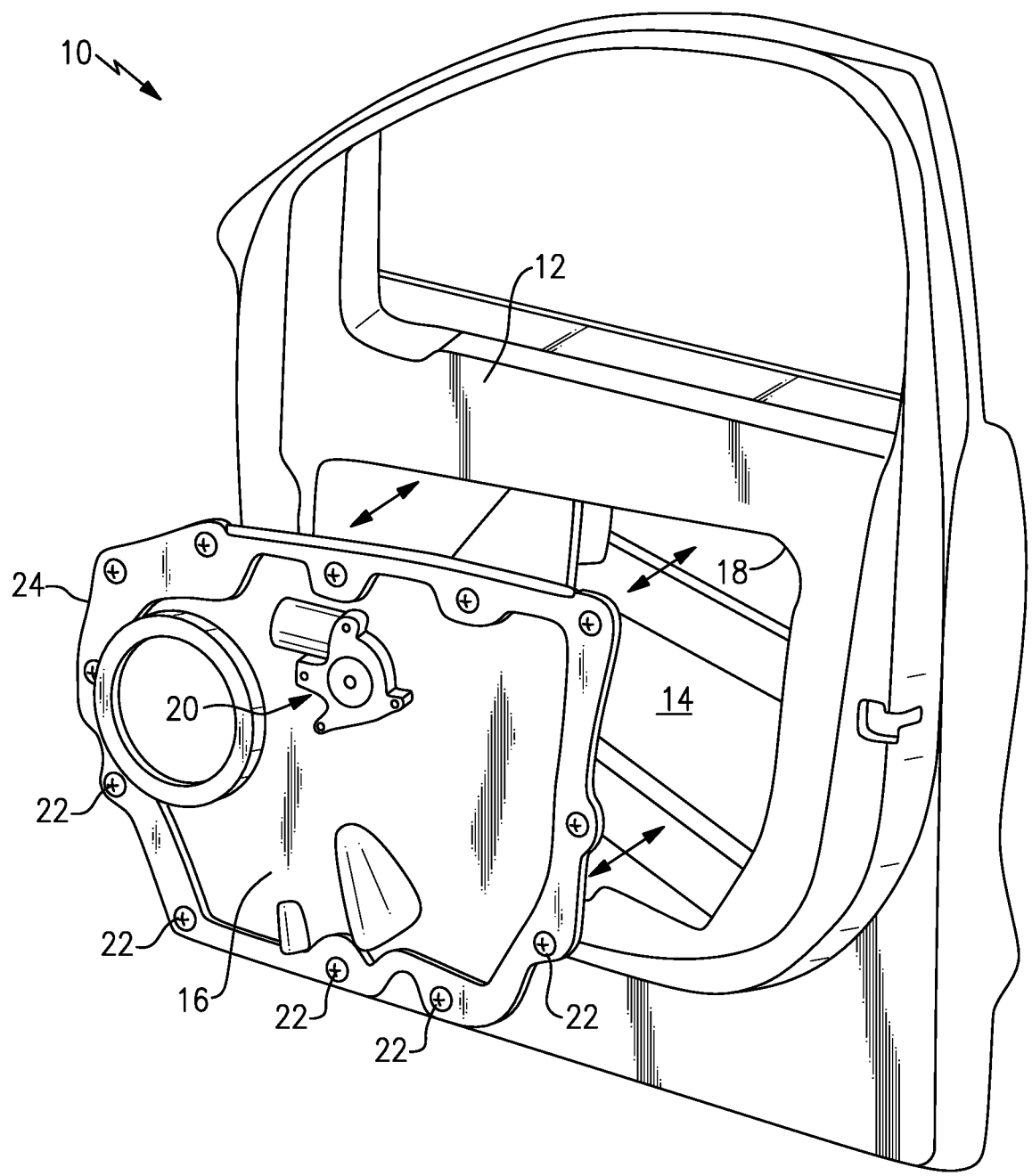
FIG. 1 is an exploded, perspective view of an example section of a motor vehicle.

Referring to the drawings, FIG. 1 illustrates a section 10 of a motor vehicle in a perspective, exploded view. Specifically, the section 10 is a section of a door of the motor vehicle, such as a driver or passenger door. The door is shown without any trim or padding attached to the door for ease of reference. While a door is shown in FIG. 1, it should be understood that this disclosure extends to other vehicle sections, and is not limited to doors. Further, it should be understood that this disclosure is not limited to any particular type of motor vehicle, and extends to vehicles driven by internal combustion engines and/or electrified vehicles. It should also be understood that this disclosure is not limited to any particular body style, and extends to cars, trucks, sport utility vehicles (SUVs), vans, etc.

The section 10 includes a first panel 12 having an opening 14, and a second panel 16 configured to cover the opening 14. Specifically, the second panel 16 is sized and shaped to correspond to the size and shape of the opening 14. The opening 14 is formed in the first panel 12 such that the first panel 12 defines a perimeter edge 18 of the opening 14. In this example, the first panel 12 is an inner panel of a door. The first and second panels 12, 16 are made of sheet metal in this example, but this disclosure is not limited to any particular material type.

The opening 14, in this example, is an access hole, and provides access to the inner components of the vehicle door. Further, in this example, the second panel 16 supports an IWR 20, which includes one or more electrical and/or mechanical components operable to raise and lower a window. Alternatively, the second panel 16 itself can be an IWR. The window and one or more associated components, may be provided in the opening 14. The IWR 20 is assembled by mounting the second panel 16 to the first panel 12. Further, the IWR 20 may be repaired or replaced by removing the second panel 16 from the first panel 12.

The second panel 16 is attached to the first panel 12 in this disclosure without the use of ordinary fasteners, such as nuts and bolts or rivets, which require individual holes to be formed in the first panel 12 corresponding to each of the fasteners. Rather, at least one swing clamp 22 is attached to the second panel 16. The swing clamp 22 is configured to clamp the first and second panels 12, 16 together, thereby securely fastening the second panel 16 to the first panel 12. A seal, such as a foam seal or a butyl adhesive seal, may be provided between the first and second panels 12, 16 to provide additional leak prevention.

In this example, the second panel 16 includes a plurality of swing clamps 22 spaced-apart from one another about a perimeter edge 24 of the second panel 16. The second panel 16 is sized and shaped such that the perimeter edge 24 corresponds to the perimeter edge 18 of the opening 14. Specifically, the second panel 16 is slightly larger than the opening 14, so that the second panel 16 covers the opening 14 when the second panel 16 is fastened to the first panel 12. While a number of swing clamps 22 are shown, it should be understood that this disclosure extends to panels that are fastened together with at least one swing clamp.

The swing clamps 22 are configured to clamp the second panel 16 to the first panel 12. In general, the swing clamp 22 is configured to selectively rotate and translate linearly, as will be discussed below. Rotation of the swing clamp 22 allows the second panel 16 to be mounted to the first panel 12. Translation of the swing clamp 22 applies a clamping force to the first panel 12, which fastens the second panel 16 firmly to the first panel 12 to hold the second panel 16 in place relative to the first panel 12.

Figure 2:
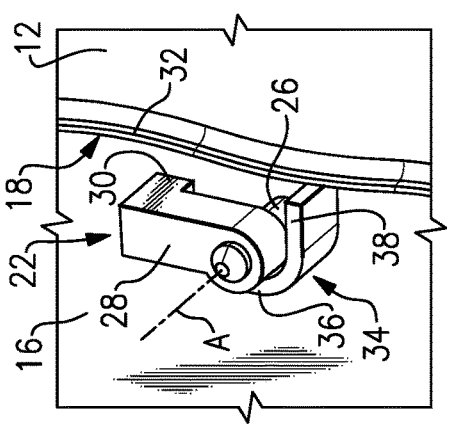
FIG. 2 illustrates the detail of the disclosed swing clamp.

FIG. 2 is a view of a swing clamp 22 from the interior of the door. Specifically, FIG. 2 is a view of the swing clamp 22 from inside the opening 14. FIGS. 2-5 illustrate the swing clamp 22 rotating and translating linearly in order to clamp the second panel 16 to the first panel 12. While only one swing claim 22 is shown in FIGS. 2-5, it should be understood that all swing clamps 22 are arranged similarly.

With specific reference to FIG. 2, the swing clamp 22 includes shaft 26 disposed along an axis A and an arm 28 projecting from the shaft 26 in a direction normal to the axis A. In this example, the arm 28 projects only to one side of the axis A. The shaft 26 is a shaft of a threaded fastener, such as a screw, in one example. The threads may be right-handed or left-handed threads. In examples where the shaft 26 is threaded, the swing clamp 22 includes internal threads corresponding to the threads of the shaft 26. The threaded fastener may include a head, such as that configured to mate with a socket or screw bit, on an opposite side of the second panel 16. This disclosure is not limited to threaded fasteners, however, and extends to other types of swing clamps.

In this example, the arm 28 includes tab 30 at a free end thereof. The tab 30 projects in a direction parallel to the axis A. Further, the first panel 12 includes a lip 32 at the perimeter edge 18. The lip 32 need not be present in all examples. The lip 32 projects toward the opening 14. As will be appreciated from the below discussion, the tab 30 and lip 32 are configured to cooperate with one another in order to align the first and second panels 12, 16.

The arm 28 is rotatable about the axis A. That said, in this example the second panel 16 includes a projection 34 configured to restrict rotation of the arm 28. The projection 34 projects inward, toward the opening 14 and out of the page (relative to FIG. 2) from the remainder of the second panel 16. The projection 34 provides a first stop 36 and a second stop 38. The first stop 36 extends in a direction substantially parallel to an adjacent section of the perimeter edge 18. The second stop 38 extends in a direction substantially normal to the adjacent section of the perimeter edge 18, and normal to the first stop 36. Thus, the projection 34 is arranged such that the arm 28 is rotatable substantially 90° between the first stop 36 and the second stop 38. In this example, a single structure provides both the first and second stops 36, 38. The first and second stops 36, 38 could be provided by separate structures, however.

In FIG. 2, the arm 28 is in a first position in which the arm 28 abuts the first stop 36 and is entirely located interiorly of the perimeter edge 18. The arm 28, in FIG. 2, extends in an upward direction, which is generally parallel to the adjacent perimeter edge 18. In this way, the second panel 16 can be aligned with the first panel 12 without interference from the swing clamp 22.

Figure 5:
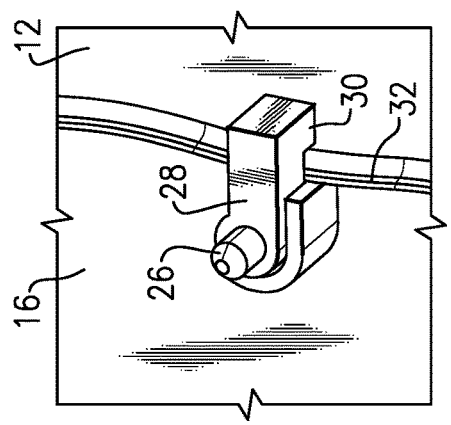
FIG. 5 illustrates the swing clamp clamping two panels together.
Figure 4:
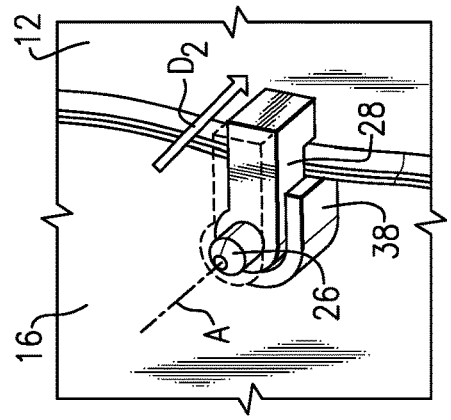
FIG. 4 illustrates the swing clamp translating linearly relative to the position of FIG. 3.
Figure 3:
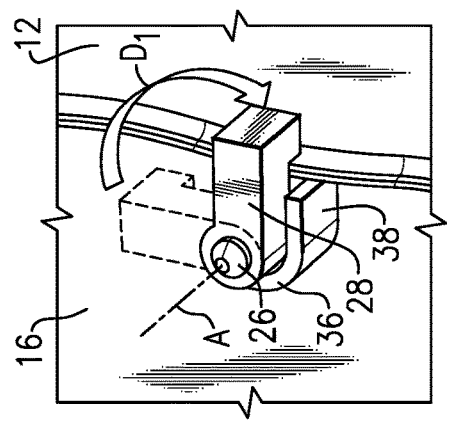
FIG. 3 illustrates the swing clamp rotating relative to the position of FIG. 2.

Once the second panel 16 is aligned with the first panel 12, as shown in FIG. 2, the shaft 26 is rotated about the axis A in a rotational direction $D_1$, which in this example is a clockwise direction relative to FIG. 3. Rotation of the shaft 26 in the rotational direction $D_1$ results in corresponding rotation of the arm 28 in the rotational direction $D_1$ until the arm 28 abuts the second stop 38. The second stop 38 prevents the arm 28 from rotating further in the rotational direction $D_1$. When the arm 28 abuts the second stop 38, the arm 28 projects in a direction substantially normal to the perimeter edge 18, and projects at least partially outward of the perimeter edge 18. Specifically, in this example, the tab 30 is outward of the lip 32, as shown in FIG. 5.

With the arm 28 abutting the second stop 38, further rotation of the shaft 26 in the rotational direction $D_1$ causes the arm 28 to translate linearly along the axis A in linear direction $D_2$. The linear direction $D_2$ is generally into the page, relative to FIG. 4, and is such that the arm 28 moves toward the first panel 12. As the arm 28 translates linearly in the direction $D_2$, the swing clamp 22 applies force to the first panel 12, which clamps the second panel 16 to the first panel 12, as generally shown in FIG. 5. As each of the swing clamps 22 are activated in this manner, the second panel 16 is securely held in place relative to the first panel 12.

It should be understood that opposite rotation of the shaft 26 detaches the swing clamp 22. Specifically, opposite rotation of the shaft 26 (i.e., in a rotational direction opposite $D_1$) translates the arm 28 linearly in a direction opposite $D_2$, and rotates the arm 28 in a rotational direction opposite $D_1$ until the arm is back in the position of FIG. 2, for example. At which point, the second panel 16 can be removed from the first panel 12.

This disclosure provides an effective and efficient way to fasten two panels together. The disclosed arrangement is relatively inexpensive, reduces leaks, increases ease of assembly, and increases ease of manufacture. Further, the use of swing clamps allows the attachment pattern to be changed with relative ease. In particular, the layout of swing clamps 22 on the second panel 16 can be changed without requiring any corresponding changes to the layout of the first panel 12.

It should be understood that terms such as "about," "substantially," and "generally" are not intended to be boundaryless terms, and should be interpreted consistent with the way one skilled in the art would interpret those terms. It should also be understood that terms such as "outer," "inner," "forward," "rear," etc., are used herein relative to the normal operational attitude of the section 10 (as it would be mounted on a motor vehicle) for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a first panel having an opening;
   a second panel configured to cover the opening;
   at least one swing clamp attached to the second panel, wherein the swing clamp is configured to clamp the second panel to the first panel, wherein the swing clamp includes a shaft disposed along an axis and an arm projecting from the shaft, and wherein the swing clamp is configured such that the arm is both rotatable about the axis and linearly translatable along the axis.

2. The motor vehicle as recited in claim 1, wherein the shaft is a shaft of a threaded fastener.

3. The motor vehicle as recited in claim 1, wherein the second panel includes a first stop and a second stop, the first and second stops limiting rotation of the arm.

4. The motor vehicle as recited in claim 3, wherein the first and second stops are arranged to allow the arm to rotate about the axis substantially 90° between the first and second stops.

5. The motor vehicle as recited in claim 3, wherein the swing clamp is configured such that rotation of shaft in a first direction causes the arm to rotate about the axis in the first direction until arm abuts one of the first and second stops, and such that further rotation of shaft in the first direction causes linear translation of the arm along the axis.

6. The motor vehicle as recited in claim 3, wherein the first panel provides a perimeter edge of the opening.

7. The motor vehicle as recited in claim 6, wherein, when the arm abuts the first stop, the arm is located interiorly of the perimeter edge, and wherein, when the arm abuts the second stop, the arm partially projects outward of the perimeter edge.

8. The motor vehicle as recited in claim 7, wherein:
   the arm includes tab,
   the first panel includes lip, and
   the tab is outward of the lip when the arm abuts the second stop.

9. The motor vehicle as recited in claim 1, wherein the at least one swing clamp includes a plurality of swing clamps, the plurality of swing clamps spaced-apart from one another about a perimeter edge of the second panel.

10. The motor vehicle as recited in claim 1, wherein the first panel is a door panel, and the second panel supports an integrated window regulator.

11. A method, comprising:
   covering an opening in a first panel with a second panel; and
   clamping the second panel to the first panel using at least one swing clamp, wherein the clamping step includes rotating an arm of the swing clamp about an axis of a shaft of the swing clamp after the covering step, and translating the arm linearly along the axis.

12. The method as recited in claim 11, wherein the rotating step includes rotating the arm substantially 90° about the axis.

13. The method as recited in claim 11, wherein the rotating step includes rotating the rotating the arm about the axis until the arm abuts a stop formed in the second panel.

14. The method as recited in claim 13, wherein, when the arm is in contact with the stop, further rotation of the shaft about the axis causes the arm to translate linearly along the axis.

15. The method as recited in claim 11, wherein:
   the first panel defines a perimeter edge of the opening,
   the arm is entirely located interiorly of the perimeter edge before the rotating step, and
   the arm partially projects outward of the perimeter edge after the rotating step.

16. The method as recited in claim 11, wherein
   the arm includes tab,
   the first panel includes lip, and
   the tab is outward of the lip after the rotating step.

* * * * *